United States Patent
Marotta

[15] 3,656,707
[45] Apr. 18, 1972

[54] POPPET VALVE ASSEMBLY WITH STRAIGHT-THROUGH FLOW

[72] Inventor: Patrick T. Marotta, Boonton Township, N.J.

[73] Assignee: Marotta Scientific Controls, Inc., Boonton, N.J.

[22] Filed: Apr. 16, 1970

[21] Appl. No.: 29,129

[52] U.S. Cl...............................251/62, 251/63, 251/158, 251/169, 251/197
[51] Int. Cl.......................................F16k 3/10, F16k 3/316
[58] Field of Search.....................251/169, 158, 197, 62, 63

[56] References Cited

UNITED STATES PATENTS

| | | | |
|---|---|---|---|
| 3,072,378 | 1/1963 | Holderer | 251/158 X |
| 2,204,142 | 6/1940 | MacClatchie | 251/169 |

FOREIGN PATENTS OR APPLICATIONS

| | | | |
|---|---|---|---|
| 535,992 | 3/1955 | Belgium | 251/197 |

Primary Examiner—Arnold Rosenthal
Attorney—Sandoe, Hopgood & Calimafde

[57] ABSTRACT

This valve assembly has a housing with aligned inlet and outlet passages, and it has a poppet valve that closes against the upstream pressure with as much force as necessary to seal the pressure of the fluid with which the valve is used. Closing pressure is applied by a mechanical toggle in one embodiment, and pressure on a piston is used in another embodiment. When the valve is open, the poppet is displaced transversely away from the axis of the aligned passages and the construction provides straight-through flow with no reduction in the cross section of the flow passage.

14 Claims, 11 Drawing Figures

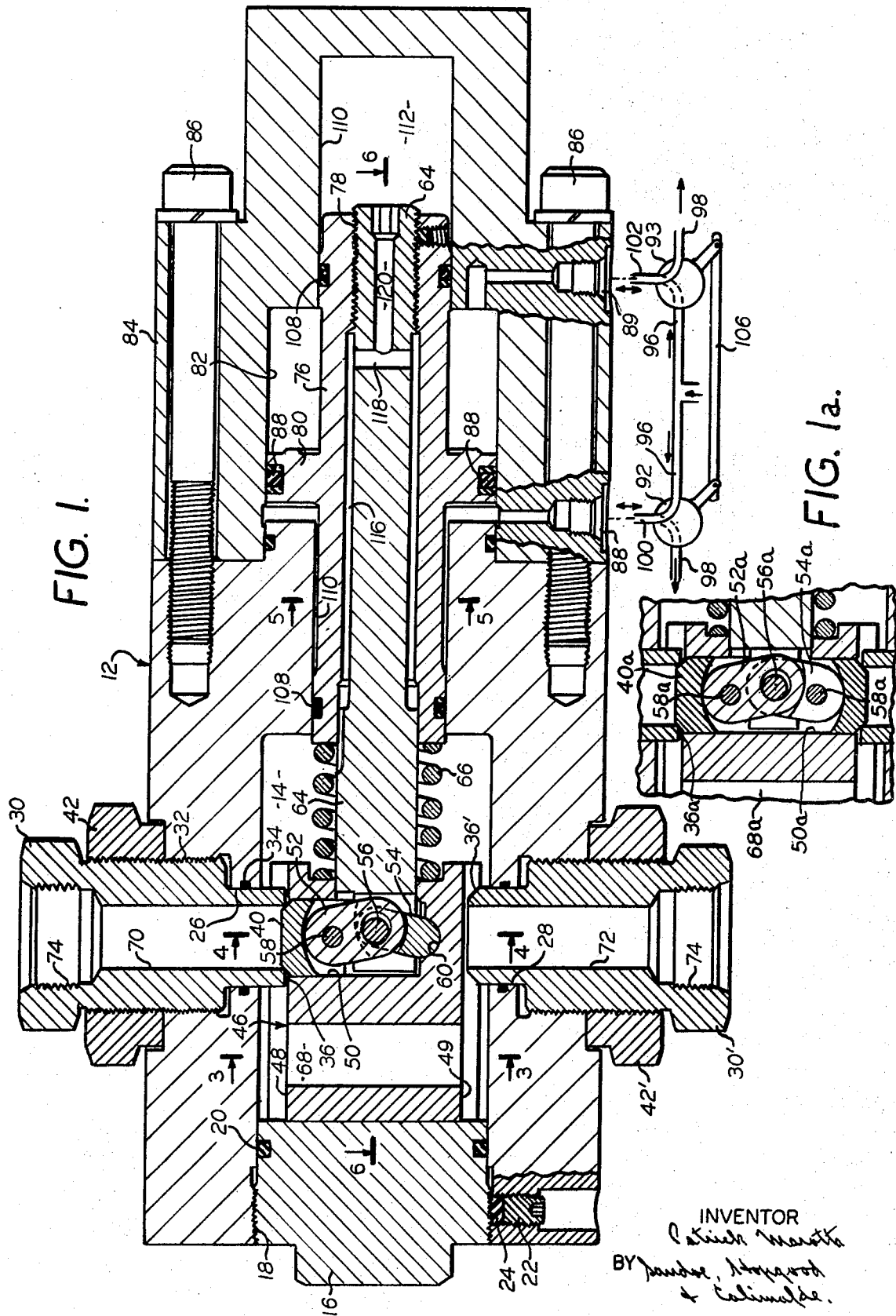

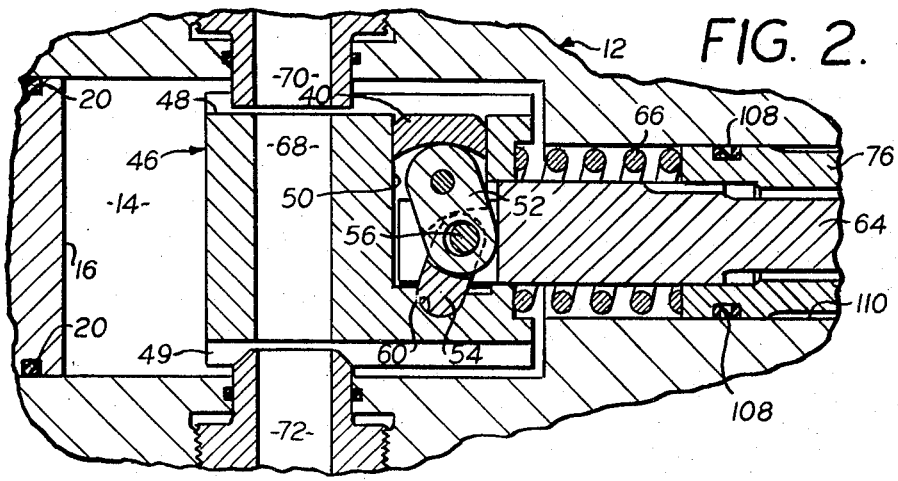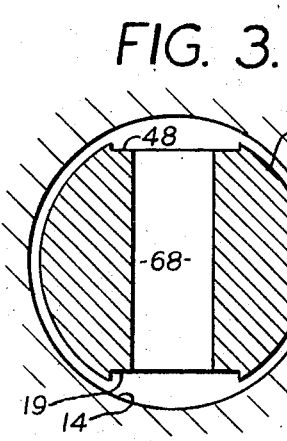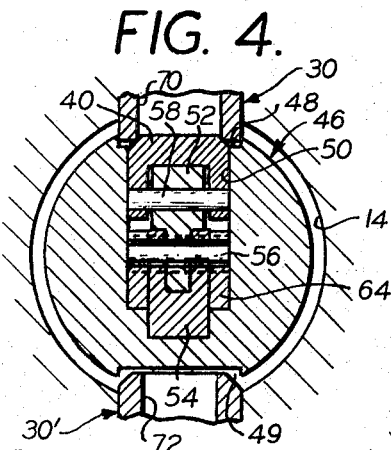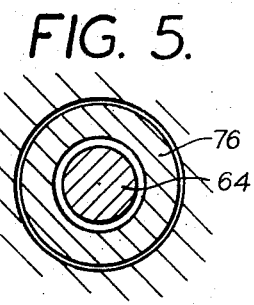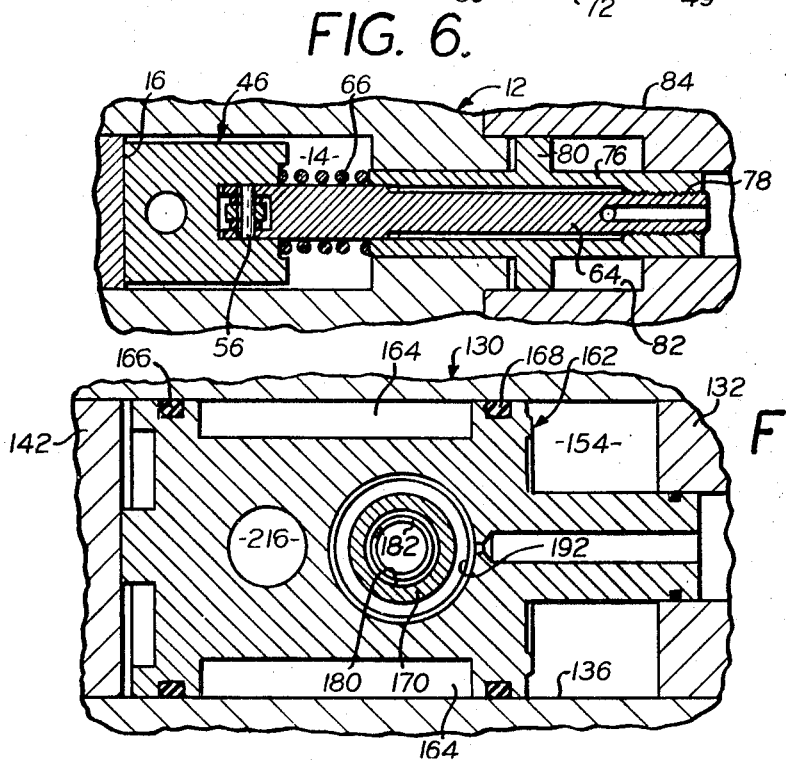
INVENTOR
Patrick Marotta
BY
ATTORNEYS.

3,656,707

POPPET VALVE ASSEMBLY WITH STRAIGHT-THROUGH FLOW

BACKGROUND AND SUMMARY OF THE INVENTION

Gate valves open to provide flow passages that have a full cross section free of obstructions, but the valve element moves in side guides transversely of the direction of flow and such valves can not seal the high pressures that are sealed by poppet valves where the valve closes in a direction axially opposed to the direction of flow and pressure of the fluid. Poppet valve elements, when in open position, are obstructions in the flow passage, and while fluid can flow around the open valve element, the pressure drop is increased. A more important disadvantage is that such valves can not be used in lines where mechanical cleanout elements have to be passed through the line from time to time.

This invention provides a straight-through flow valve, i.e., a valve which has a straight and unobstructed passage of full cross section through the valve housing when the valve is open. The valve assembly of this invention includes a poppet valve element that closes against the inlet pressure with provision for exerting as much closing force as necessary for sealing the pressure in the line in which the valve is intended to be used. When the valve assembly of this invention is in open position, however, the poppet valve is displaced from the fluid flow path and the valve assembly provides a passage of the full cross section of the inlet and outlet passages of the housing and in alignment with these passages to obtain all of the advantages of a gate valve.

The force for closing the poppet valve is applied mechanically in one embodiment of this invention. In the preferred mechanical force application, the poppet valve element is operated by a toggle linkage and preferably a linkage in which the full force of the pressure is carried by the links themselves instead of the pivot connections which join the links to each other and to their actuator.

In another embodiment of the invention, the force for operating the poppet valve element is applied by fluid pressure acting against a piston. In both of the illustrated constructions of this specification, the valve is moved between open and closed positions by fluid pressure so as to make practical pilot operation and remote control; but it will be understood that mechanical actuators can be used, if desired.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a sectional view through a valve assembly made in accordance with this invention and having a poppet valve operated by a toggle linkage; the valve assembly being shown in closed position;

FIG. 1a is a detail view showing the valve of FIG. 1 equipped with two poppet valves for flow from either direction;

FIG. 2 is a fragmentary sectional view showing the construction of FIG. 1 with the valve assembly in open position;

FIGS. 3, 4 and 5 are sectional views taken on the lines 3—3, 4—4 and 5—5, respectively, of FIG. 1;

FIG. 6 is a diagrammatic sectional view, on a reduced scale, taken on the line 6—6 of FIG. 1;

FIG. 10 is a sectional view taken on the line 10—10 of FIG. 7.

DESCRIPTION OF PREFERRED EMBODIMENT

Figure 7:
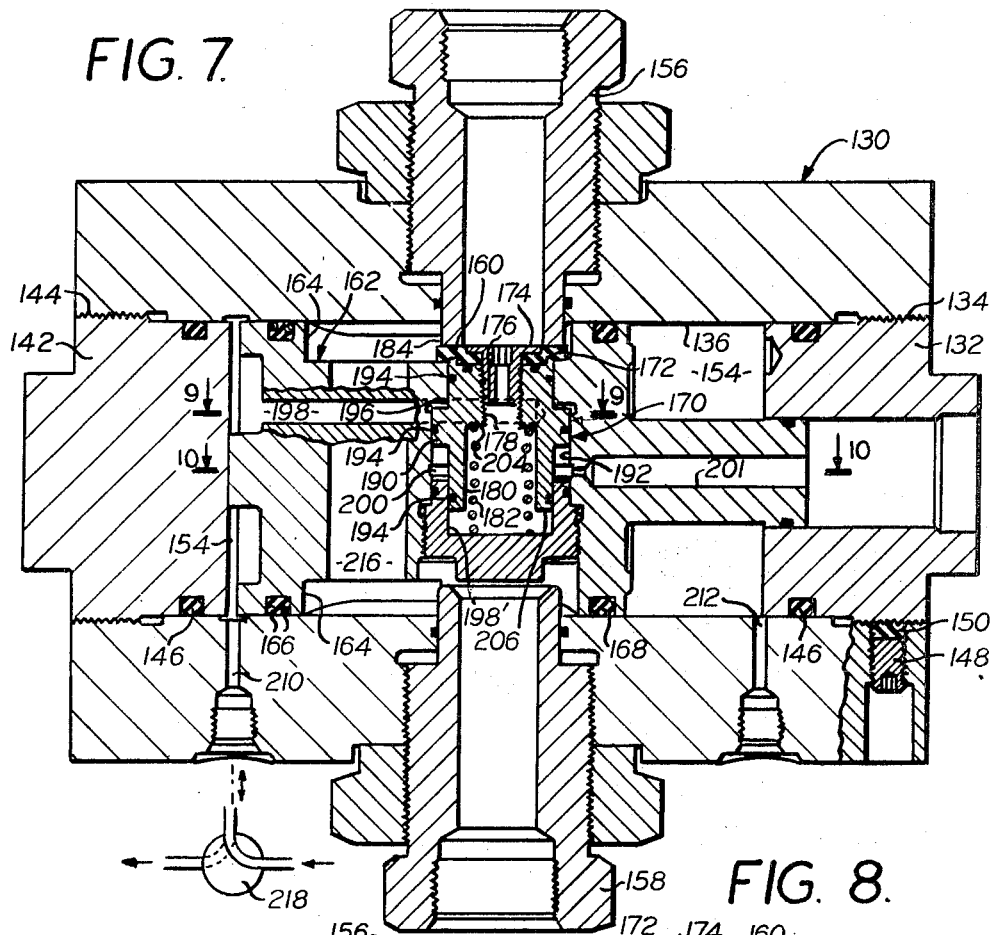
FIG. 7 is a sectional view, similar to FIG. 1, but showing a modified form of the invention in which the poppet valve element is operated by fluid pressure instead of a mechanical actuator.
Figure 8:
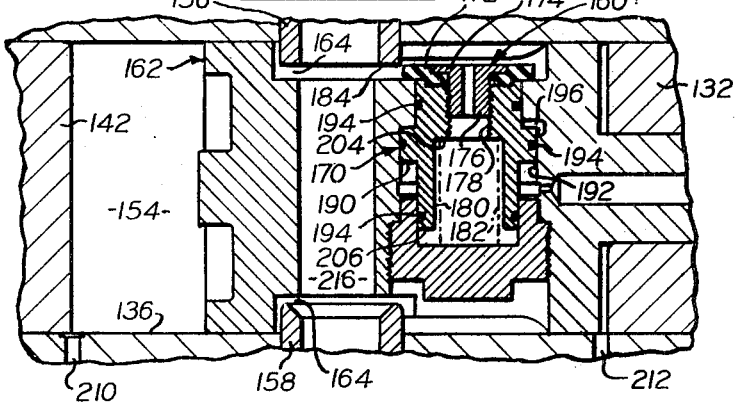
FIG. 8 is a sectional view, at the same plane as FIG. 7 but illustrating the positions of the parts when the valve assembly is in open position.

The valve assembly shown in FIG. 1 includes a main housing 12 which encloses a valve chamber 14. The valve chamber is closed at one end by a plug 16 that has threads 18 along which the plug is adjustable axially of the valve chamber 14. The plug has an end portion that fits into the cylindrical valve chamber 14 and there is an O-ring 20 for sealing the plug 16 to prevent escape of fluid from the valve chamber 14 past the plug 16. A set screw 22 has a plastic end plug 24 which bears against the threads of the plug 16 to prevent the plug 16 from moving out of adjustment.

An inlet opening 26 extends through the top wall of the housing 12 and a corresponding outlet opening 28 extends through the bottom wall, these openings being in axial alignment with one another. There is an inlet fitting 30 which has threads 32 that screw into the inlet opening 26.

Beyond the threads 32 the inlet fitting 30 has a reduced diameter which fits through a smooth bore portion of the inlet opening 26 having a sealing ring 34, and this reduced-diameter portion of the inlet fitting 30 extends for some distance radially into the valve chamber 14 and has an end face 36 which is a valve seat for a poppet valve element 40.

The outlet opening 28 has an outlet fitting 30' which is threaded into the housing by a construction which is similar to that of the inlet fitting, corresponding parts being indicated by the same reference characters with a prime appended. The outlet fitting 30', however, has an end face 36' which does not serve as a valve seat in the construction illustrated. If the valve shown in FIG. 1 is constructed to seal against flow in either direction, then a valve seat in the outlet fitting 30' is necessary, for co-operation with a second poppet valve, as will be described in connection with FIG. 1a.

The extent to which the fittings 30 and 30' extend radially into the valve chamber 14 can be adjusted by screwing these fittings one way or the other on their threads 32; and the fittings 30 and 30' have lock nuts 42 and 42', respectively, which clamp against recessed faces on the outside of the housing 12 to hold the fittings 30 and 30', respectively, in the positions to which they are adjusted.

Inside of the valve chamber 14 there is a valve assembly comprising a carrier 46 which is of generally cylindrical cross section, as shown in FIG. 3, but which has an upper channel 48 and a lower channel 49 cut in its upper and lower portions, respectively, for receiving the inner ends of the fittings 30 and 30', respectively. The end portions of these fittings 30 and 30' serve, in effect, as keys with the channels 48 and 49 functioning as keyways to prevent rotation of the carrier 46 about its longitudinal axis. These inner end portions of the fittings 30 and 30' also provide part of the support for holding the carrier 46 centered in the valve chamber 14.

The carrier 46 also has a recess or bore 50 (FIG. 4) which is preferably normal to the longitudinal axis of the carrier 46. This recess or bore 50 provides a guide for the poppet valve element 40, and the poppet valve element 40 is moved up and down in the bore 50.

The poppet valve element 40 is actuated by a toggle linkage which includes an upper link 52 and a lower link 54. These links 52 and 54 are connected together by a pivot pin 56 but the pivot pin 56 is preferably made as a loose connection between the links 52 and 54 for purposes which will become apparent.

The lower part of the poppet valve element 40 is of bifurcated construction and the upper link 52 extends into the open center portion of the bifurcated lower end of the poppet valve element 40 as shown in FIG. 4. A pin 58 provides a loose connection between the upper link 52 and the valve element 40. The loose connection at the pin 58 permits the upper end of the link 52 to bear against a concave cylindrical surface of the poppet valve element 40, best shown in FIG. 1.

The upper end of the link 52 is of convex cylindrical construction so that it can maintain its contact with the poppet valve element as the toggle link straightens. The link 54 has a convex cylindrical lower end which fits into a complementary concave socket 60 at the bottom of the recess or bore 50. The upper end of the link 54 extends into a bifurcated lower part of the link 52 and bears against a concave cylindrical surface of the upper link 52 in the same manner in which the upper end of the link 52 bears against the poppet valve element 40.

An actuator rod 64 is connected with the pivot pin 56. Axial movement of the actuator rod 64, to the left in FIG. 1, moves the toggle links 52 and 54 more nearly into alignment with one another and thus displaces the poppet valve element 40 upward and into contact with the valve seat 36. Because of the loose connections of the pins 56 and 58 with their respective links, the force thrusting the poppet valve element 40 against the seat 36 is transmitted through the links 52 and 54 from the socket 60 through the convex and concave surfaces of the links 52 and 54 and of the link 52 and poppet valve element 40. Thus the high pressure exerted by the poppet valve element 40 against its seat 36 does not pass through the pins 56 and 58. This permits the pins to be of much smaller diameter and greatly reduces the dimensions of the toggle linkage.

The purpose of the pins 56 and 58 is for moving the poppet valve element 40 into open position. A further purpose of pin 56 is to loosely connect actuator rod 64 with carrier 46. When the actuator rod 64 is moved toward the right in FIG. 1, against the pressure of the spring 66, the toggle links 52 and 54 move into a smaller angular relationship with one another. This folding of the toggle is facilitated by the pressure of fluid against the valve element 40 which thrusts the toggle linkage downward.

When the poppet valve element 40 has moved downward enough to clear the seat 36, the pin 56 contacts its mating surfaces of the carrier 46, further movement of the actuator rod 64 to the right moves the carrier 46 until a passage 68, through the carrier 46, moves into alignment with the fluid passages through the fittings 30 and 30'. These fluid passages, designated by the reference characters 70 and 72 in the fittings 30 and 30', respectively, are of uniform cross section except for threaded bores 74 which are provided for screwing tubes or tube fittings into the ends of the inlet and outlet fittings. The fluid passage 68 through the carrier 46 is of the same cross section as the fluid passages 71 and 72 through the inlet and outlet fittings, respectively.

FIG. 1a shows a modified construction. All parts corresponding to those of FIG. 1 are indicated by the same reference characters with a letter a appended. The only difference from FIG. 1 is that there is a second poppet valve 40a' for closing the passage 72a'. The valve 40a' is connected to a link 54a' by a pin 58a'.

FIG. 2 shows the position of the valve assembly when it is in open position with the fluid passage 68 of the carrier 46 in alignment with the passages 70 and 72. It will be apparent that, with the parts in the positions shown in FIG. 2, a mechanical cleanout device can pass through the valve housing.

Referring again to FIG. 1, the actuator rod 64 extends through a sleeve 76 and has threads 78 which screw through complementary threads near one end of the sleeve 76. There is a flange on the sleeve 76 which constitutes a piston 80. This piston 80 slides in a cylinder 82 formed in an end housing 84 attached to the main housing 12 by angularly spaced screws 86 located in a circle around the center of the end housing 84. The piston 80 has sealing rings 88 in contact with the wall of the cylinder 82. The actuator 64 is moved by applying pressure to one side or the other of the piston 80. There are ports 88 and 89 at opposite ends of the cylinder 82 for the admission and the exhaust of working fluid that operates the piston 80.

FIG. 1 shows diagrammatic means for operating the piston 80, the actuator rod 64 and the valve assembly. These means include three-way valves 92 and 93 connected with a source of fluid pressure by tubing 96. Each of the valves 92 and 93 has an exhaust 98 which opens into the atmosphere or which returns back to a tank, depending upon whether the working fluid is air or hydraulic fluid.

The valve 92 is connected by tubing 100 to the port 88; and the valve 93 is connected by tubing 102 to the port 89. When the valves 92 and 93 are in the positions shown in full lines in FIG. 1, working fluid under pressure flows through the tubing 100 to apply pressure to move the piston 80 to the right. Working fluid ahead of the piston is exhausted through the tubing 102 and the exhaust port 98. When the valves 92,93 are in the dotted-line positions shown in FIG. 1, the direction of movement of the piston 80 is reversed. The valves 92 and 93 are operated in unison by a manually controlled actuator 106.

The sleeve 96 has O-ring seals 108 beyond both ends of the cylinder 82 for preventing escape of working fluid from the cylinder. These seals 108 contact with a guide 110 in which the sleeve 76 slides and the guide 110 is of the same cross section beyond both ends of the cylinder 82 so as to provide for pressure balancing of the sleeve 76.

The pressure balance of the sleeve 76 is obtained by having a chamber 112 in one end of the end housing 84. Fluid in the valve chamber 14 can flow to and from the chamber 112 so as to maintain the pressure in the chamber 112 equal to that in the valve chamber 14. This flow is along slots 116 in the outside of the actuator rod 64 back to the threads 78. Just ahead of the threads 78 there is a cross drilling 118 through the actuator rod 64 communicating with an axial passage 120 which leads from the cross drilling 118 through the end face of the actuator rod 64.

Control of the alignment of the poppet valve element 40 with the seat 36, when the valve assembly is in closed position, is obtained by adjusting the plug 16 so that when the carrier 46 is held against the plug 16, the poppet valve element 40 is in correct alignment with its valve seat.

Control of the alignment of the passage 68 with the flow passages 70 and 72, when the valve assembly is in open position, is effected by adjusting the actuator bar 64 along the threads 78 so that the piston 80 contacts with the right end of the cylinder 82 to stop the carrier 46.

FIG. 7 shows a modifed form of the invention in which the principle of operation is the same as for FIG. 1 but the means for moving the valve assembly and the poppet valve element comprises pistons in place of mechanical actuators. FIG. 7 shows a housing 130 closed at its right end by a plug 132 having threads 134 which screw into a threaded counterbore of a cylindrical bore 136 which extends through the full length of the housing 130. The other end of the housing is closed by a plug 142 which has threads 144 screwed into a threaded counterbore at the opposite end of the cylindrical bore 136. Both of the plugs 132 and 142 have O-ring seals 146 in contact with the cylindrical bore 136.

Provision is made for adjusting the plug 132 to change the length of the space between the plugs 132 and 142. This provision includes a set screw 148 having a plastic plug 150 which bears against the threads 134 of the plug 132 for holding the plug in any adjusted position to which it is brought by screwing it along the complementary threads in the counterbore. The plug 142 can be provided with similar adjustment control.

The space between the confronting faces of the plugs 132 and 142 comprises a valve chamber 154. An inlet fitting 156 and outlet fitting 158 extend through openings in the wall of the housing 130. These fittings 156 and 158 are in alignment with one another and each one extends radially into the valve chamber 154 to an adjustable and controlled extent, the construction being the same as already described in connection with FIG. 1.

Within the valve chamber 154 there is a valve assembly comprising a poppet valve element 160 and a carrier 162. The carrier 162 has channels 164 at its upper and lower surfaces. The inner ends of the fittings 156 and 158 extend into the channels 164.

The carrier 162 slides in the cylindrical bore 136 as a piston and has sealing rings 166 and 168 beyond opposite ends of the channels 164, for preventing escape of fluid from the channels 164 into the valve chamber 154 beyond the ends of the carrier 162.

The poppet valve element 160 is formed at the upper end of a valve body 170 and it consists of a plastic facing 172 clamped against the upper end of the valve body 170 by a flange 174 extending from a threaded sleeve 176 which screws into a center bore 178 in the valve body 170. The bore 178 opens into a larger counterbore 180 which extends all the way to the lower end of the valve body 170 and this counterbore 180 houses a spring 182 which urges the valve body 170 upward to hold the poppet valve element 160 against its seat 184 which is provided by the end face of the inlet fitting 156. Unlike the tapered valve seat of FIG. 1, the preferred construction shown in FIG. 7 has a flat annular face 184 as the valve seat and no part of the valve element 160 extends beyond the end face 184 into the flow passage of the inlet fitting 156. Thus the poppet valve element 160 can move transversely of the axis of the flow passage of the inlet fitting 156 without damage to any part of the structure, though it is not intended to move transversely until it has moved away from the valve seat, as will be more fully explained.

Figure 9:
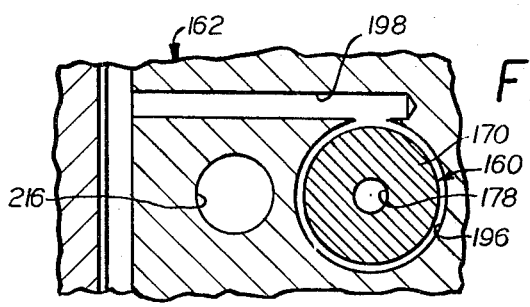
FIG. 9 is a sectional view taken on the line 9—9 of FIG. 7.

The valve body 170 has a flange portion 190 which is a piston in a cylinder 192 formed in the carrier 162. This piston 190 has a sealing ring 194. At the upper end of the cylinder 192 there is an annular clearance 196 into which working fluid is admitted from a working fluid supply passage 198 which extends generally tangentially to the cylinder 192, but partially chordal, as shown in FIG. 9.

The valve body 170 above piston 190 extends through a guide bore 199 having a sealing ring 194 for preventing escape of working fluid from the cylinder 192. Below the piston 190, there is another clearance 200 in the wall of the cylinder 192; and in the illustrated construction, this clearance 200 is vented to the atmosphere through a passage 201. The valve body 170, at the lower end of the cylinder 192, is of reduced diameter and slides in a guide bore 199' of the same diameter as the bore 199 and with a similar sealing ring 194.

The diameter of the lower end of the valve body 170 is substantially greater than the effective diameter of the poppet valve element 160 which is exposed to high pressure in the fitting 156.

Fluid from the inlet, at high pressure, passes through an opening in the sleeve 176 and acts against faces 204 and 206 of the valve body 170. Since the sum of the areas of the faces 204 and 206 are greater than the area of the poppet valve exposed to the high pressure of the inlet passage through the fitting 156, and this inlet pressure is higher than in the channels 164, the valve body 170 is pushed up against the valve seat to close the poppet valve.

From this description of the valve body 170 it will be apparent that it consists of a sleeve structure with a flange piston similar in many respects to the means for operating the actuator rod 64 of FIG. 1, but the operation of the valve is direct instead of through a mechanical linkage.

When the valve assembly of FIG. 7 is to be moved to its open position, working fluid under pressure is introduced through a passage 210 into the left hand end of the valve chamber 154. This working fluid passes through the passage 198 into the cylinder 192 above the piston 190 and moves the piston 190 and the valve body 170 downward so that the poppet valve 160 moves out of contact with its seat.

As working fluid pressure builds up on the left hand side of the carrier 162, the carrier moves to the right in FIG. 7 until it contacts with the plug 132 which limits the stroke of the carrier to the right. The carrier 162 is stopped with a straight-through flow passage 216 in alignment with the fluid passage through the inlet fitting 156 and the outlet fitting 158.

Working fluid to the right of the carrier 162 is displaced from the valve chamber through a passage 212. If this displaced fluid passes into a pressure dome, the same pressure can be used to restore the valve assembly to its closed position when the pressure in the left hand end of the valve chamber is released by a valve 218.

The preferred embodiments of the invention have been illustrated and described, but changes and modifications can be made and some features can be used in different combinations without departing from the invention as defined in the claims.

What is claimed is:

1. A straight-through flow valve including a housing enclosing a cylindrical valve chamber and cylindrical guiding surfaces, inlet and outlet passages on opposite sides of the valve chamber and in axial alignment with one another, a valve assembly in the chamber between the inlet and outlet passages, said valve assembly including a carrier, part of which is movable in the cylindrical guiding surfaces in the housing between open and closed positions along the axis of the cylindrical guide surfaces and transverse of the axis of alignment of the inlet and outlet passages, and said carrier having a passage therethrough in axial alignment wit the inlet and outlet passages when the carrier is in open position, the carrier having a channel with a flat bottom surface on one side extending lengthwise thereof and confronting the cylindrical surface of the valve chamber, a fitting through which at least one of the passages extends, said fitting extending from said cylindrical surface into the channel toward said flat surface and terminating adjacent to said flat surface, and a poppet valve on the carrier movable relative to the carrier in directions substantially normal to the direction of movement of the carrier in the chamber, a seat on said fitting and surrounding at least one of said passages at an end of the passage confronting the valve assembly, the poppet valve being in alignment with said seat when the valve assembly is in closed position, and means for moving the poppet valve toward and from said seat.

2. The valve described in claim 1 characterized by the passage through the carrier being unobstructed and of the same cross-section as the inlet and outlet passages.

3. The valve described in claim 1 characterized by the passage through the carrier constituting a continuation of the inlet and outlet passages when in alignment therewith.

4. A straight-through flow valve including a housing enclosing a valve chamber and having cylindrical guiding surfaces, inlet and outlet passages on opposite sides of the valve chamber and in axial alignment with one another, a valve assembly in the chamber between the inlet and outlet passages, said valve assembly being movable in the cylindrical guiding surfaces of the chamber between open and closed positions along the axis of the cylindrical guide surfaces and transverse of the axis of alignment of the inlet and outlet passages, and said valve assembly including a carrier with a passage therethrough in axial alignment with the inlet and outlet passages when the carrier is in open position, and a poppet valve on the carrier movable relative to the carrier in directions substantially normal to the direction of movement of the carrier in the chamber, a seat surrounding at least one of said passages at an end of the passage confronting the valve assembly, the poppet valve being in alignment with said seat when the valve assembly is in closed position, and means for moving the poppet valve toward and from said seat, characterized by the carrier being movable with a straight line stroke and with said open and closed positions at different ends of the stroke, said carrier including an element having channels in opposite sides thereof, fittings through which the inlet and outlet passages extend, each of said fittings extending into a different one of the channels, and the passage through the carrier opening at opposite ends into said channels.

5. The valve described in claim 4 characterized by one of the fittings that extend into the channels serving as a key to prevent rotation of the carrier in the valve chamber, and means for adjusting the extent to which each of the fittings extend into its associated channel.

6. The valve described in claim 1 characterized by cylinder-and-piston motor means operatively connected with the carrier and with the poppet valve for moving the carrier between open and closed positions and for moving the poppet valve as a shut-off valve for controlling flow from the inlet passage when the carrier is in closed position.

7. The valve described in claim 6 characterized by the carrier being movable through a straight line stroke between open and closed positions, the cylinder-and-piston motor means including a cylinder in the housing and a piston in the cylinder operably connected with both the carrier and the poppet valve for moving the carrier through said stroke and for moving the poppet valve into position to shut off flow from the inlet passage when the carrier is at the closed position end of its stroke.

8. The valve described in claim 7 characterized by the fitting being in the inlet passage, a seat on the inner end of the inlet fitting and with which the poppet valve contacts, a linkage on the carrier in position to press the poppet valve against the seat in a direction on alignment with the inlet passage, the poppet valve and the seat having confronting surfaces, one of which is tapered, said linkage being movable into position to make the tapered surface clear the other confronting surface preparatory to movement of the poppet valve with the carrier in a direction transverse of the axis of the inlet and outlet passages, an actuator bar connecting the linkage with the piston, and a stop in position to prevent further movement of the linkage after the poppet valve has moved into position in which the tapered surface clears the surface which it confronts whereby further travel of the actuator bar moves the carrier toward open position.

9. The valve described in claim 8 characterized by the linkage that operates the poppet valve being a toggle with its midportion connected with the actuator bar by a pivot connection, one end of the toggle having a face contacting with a face within the poppet valve and the other end of the toggle having a face contacting a face of the carrier, the links of the toggle also having confronting faces thereof that contact with one another, and the pivot connection being loose enough for the confronting faces on the toggle links to bear against one another as the toggle moves toward a straight position to transmit pressure from the carrier face to the poppet valve through the contacting faces and independent of the pivot, said contacting faces including complementary concave and convex surfaces.

10. The valve described in claim 1 characterized by the carrier being a piston movable in the cylindrical guiding surfaces to shift the carrier along a straight line stroke between open and closed positions, abutment means that stop the carrier at each end of its stroke with the poppet valve in alignment with the inlet passage when the carrier is at one end of its stroke and with the passage through the carrier in alignment with the inlet passage when the carrier is at the other end of its stroke.

11. The valve described in claim 10 characterized by the valve chamber being a bore through the housing, and the abutment means being plugs closing opposite ends of the bore and threaded into the ends of the bore and adjustable along said threads to determine the stroke of the carrier and to align the poppet valve and the passages through the carrier with the inlet passage when the carrier is at opposite ends of its stroke.

12. The valve described in claim 10 characterized by partially chordal extending channels in opposite circumferential portions of the carrier at an intermediate portion of the carrier and extending axially for a distance as great as the stroke of the carrier plus the width of the inlet passage in the direction of movement of the carrier.

13. The valve described in claim 10 characterized by a cylinder-and-piston motor in the carrier and behind the poppet valve with a stroke in the direction of extent of the aligned inlet and outlet passages.

14. The valve described in claim 13 characterized by there being two concentric cylinder-and-piston motors in the carrier, means sealing the working fluid spaces on said cylinder-and-piston motors from one another, a passage through the poppet valve and into the cylinder of the first of said motors, the piston of the first motor being of larger cross-section than the effective surface of the poppet valve which is exposed to fluid pressure in the inlet passage for holding the poppet valve close against a flat end face of the inlet passage, which face surface has a seat for the poppet valve, and common means for supplying working fluid behind the carrier, to move the carrier into open position, and on the side of the piston of the second motor to move the poppet valve away from the end of the inlet passage.

* * * * *